(12) United States Patent
Kusters et al.

(10) Patent No.: US 6,473,775 B1
(45) Date of Patent: Oct. 29, 2002

(54) SYSTEM AND METHOD FOR GROWING DIFFERENTIAL FILE ON A BASE VOLUME OF A SNAPSHOT

(75) Inventors: Norbert P. Kusters, Woodinville; Luis Felipe Cabrera, Bellevue; Brian D. Andrew, Redmond, all of WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/505,450

(22) Filed: Feb. 16, 2000

(51) Int. Cl.[7] ............................ G06F 12/00; G06F 17/30
(52) U.S. Cl. ................................................ 707/200
(58) Field of Search ........................... 707/8, 100–102, 707/200–204; 711/1–6, 100–117, 147–153

(56) References Cited

U.S. PATENT DOCUMENTS

| | | | | |
|---|---|---|---|---|
| 5,175,849 A | * | 12/1992 | Schneider | 707/202 |
| 5,403,639 A | * | 4/1995 | Belsan et al. | 707/204 |
| 5,761,526 A | | 6/1998 | Sakakura et al. | |
| 5,819,292 A | * | 10/1998 | Hitz et al. | 707/203 |
| 5,915,264 A | | 6/1999 | White et al. | |
| 5,956,713 A | * | 9/1999 | Bamford et al. | 707/201 |
| 5,963,959 A | * | 10/1999 | Sun et al. | 707/100 |
| 6,023,744 A | * | 2/2000 | Shoroff et al. | 707/205 |
| 6,038,639 A | * | 3/2000 | O'Brien et al. | 711/114 |
| 6,105,030 A | | 8/2000 | Syed et al. | |
| 6,289,335 B1 | * | 9/2001 | Downing et al. | 707/101 |
| 6,289,356 B1 | * | 9/2001 | Hitz et al. | 707/201 |
| 6,341,341 B1 | * | 1/2002 | Grummon et al. | 711/162 |

* cited by examiner

Primary Examiner—John Breene
Assistant Examiner—Linh M Pham
(74) Attorney, Agent, or Firm—The Law Offices of Albert S. Michalik, PLLC

(57) ABSTRACT

A system and method for creating a snapshot with a differential file maintained on the base volume that can grow as needed. When a snapshot is captured, free space is allocated on the base volume to receive the differential file. Writes to the base volume are allowed except to the free space allocated to the differential file. Then the snapshot is captured. After the snapshot process is complete, data that was originally present at the time the snapshot was captured may be copied to the differential file before it is modified. To grow the differential file out of its allocated space, new free space is selected from the free space currently on the base volume in conjunction with the free space at the time the snapshot was captured. The free space bitmap file of the snapshot volume may be used to identify the free space at the time the snapshot was captured.

28 Claims, 7 Drawing Sheets

SYSTEM AND METHOD FOR GROWING DIFFERENTIAL FILE ON A BASE VOLUME OF A SNAPSHOT

FIELD OF THE INVENTION

The present invention generally relates to computer systems, and, more particularly to the storage of information in a file system.

BACKGROUND OF THE INVENTION

A "snapshot" is essentially a logical copy of the information stored on a volume at a particular instant in time. A snapshot may be used like a backup copy of the volume, but is much faster to create than a full backup. As used herein, a "base volume" is the actual volume of which the snapshot was taken. A snapshot system uses a differential file to track the changes written to the base volume after the snapshot is captured. If multiple snapshots are taken over time, a differential file exists for each snapshot.

To maintain the snapshot data, when a change is written to an allocation unit (e.g., a cluster) that was in use at the time of the snapshot, the original data is copied from the allocation unit to the differential file before writing the new data. This method is often referred to as "copy-on-write." In this way, the state (i.e., snapshot) of the base volume at the time the snapshot was taken is accessible by reading current data from the base volume in conjunction with any data stored in the differential file associated with the snapshot.

In many computer systems, there may be a desire to maintain the differential file on the base volume, for instance if there is only one volume in the computer system. However, there are problems associated with maintaining the differential file on the base volume.

One problem is that the process of capturing the snapshot may take a relatively significant amount of time. During that time, potentially many writes may occur to the base volume. Suspending writes to the base volume during the time that the snapshot is being captured negatively impacts perceived system performance.

Another problem with maintaining a differential file on the base volume arises after the snapshot has been captured. If a significant number of writes occur to the base volume after the snapshot is created, the differential file may become full. With prior systems, a snapshot became invalid for its intended purpose once the differential file became full and new writes to the base volume could no longer be tracked. Accordingly, a large amount of space needs to be reserved for such differential files so that they remain valid for a long time. However, reserving large amounts of space is extremely wasteful if that space is not subsequently used.

An efficient mechanism for creating a snapshot of a base volume and maintaining a differential file on the base volume has eluded those skilled in the art. Accordingly, a need exists for an improvement to existing snapshot systems to better manage differential files on base volumes.

SUMMARY OF THE INVENTION

The present invention provides a system and method for creating a snapshot with a differential file without suspending writes, wherein the differential file is maintained on the base volume and can grow as needed. When notice is received that a snapshot is to be created, existing free space is allocated on the base volume to store the differential file for the snapshot. Writes to the base volume are allowed, except that writes to the free space allocated to the differential file are prevented by the pre-allocation. Then the operations necessary to capture the snapshot are performed. By pre-allocating free space on the base volume, writes to the base volume may continue while ensuring that the differential file is available to track new writes at the instant the snapshot is captured. In this manner, the snapshot system is afforded the time necessary to complete the snapshot process without having to suspend writes to the entire base volume. After the snapshot process is complete, data may be copied to the differential file as writes are received (copy-on-write).

In accordance with another aspect of the invention, a mechanism is provided to allow the differential file to grow beyond its currently allocated space. Over time, the differential file may start becoming full. To safely grow the differential file, additional free space is identified. The present invention selects new free space from the free space currently on the base volume in conjunction with the free space at the time the snapshot was captured. In this manner, the differential file may expand into free space on the base volume that was also free at the instant the snapshot was captured without overwriting allocation units on the base volume that the snapshot needs. Preferably, the free space bitmap file of the snapshot volume is used to identify the free space at the time the snapshot was captured. In this way, the present invention enables a differential file to safely grow as needed.

DETAILED DESCRIPTION

Exemplary Operating Environment

Figure 1:
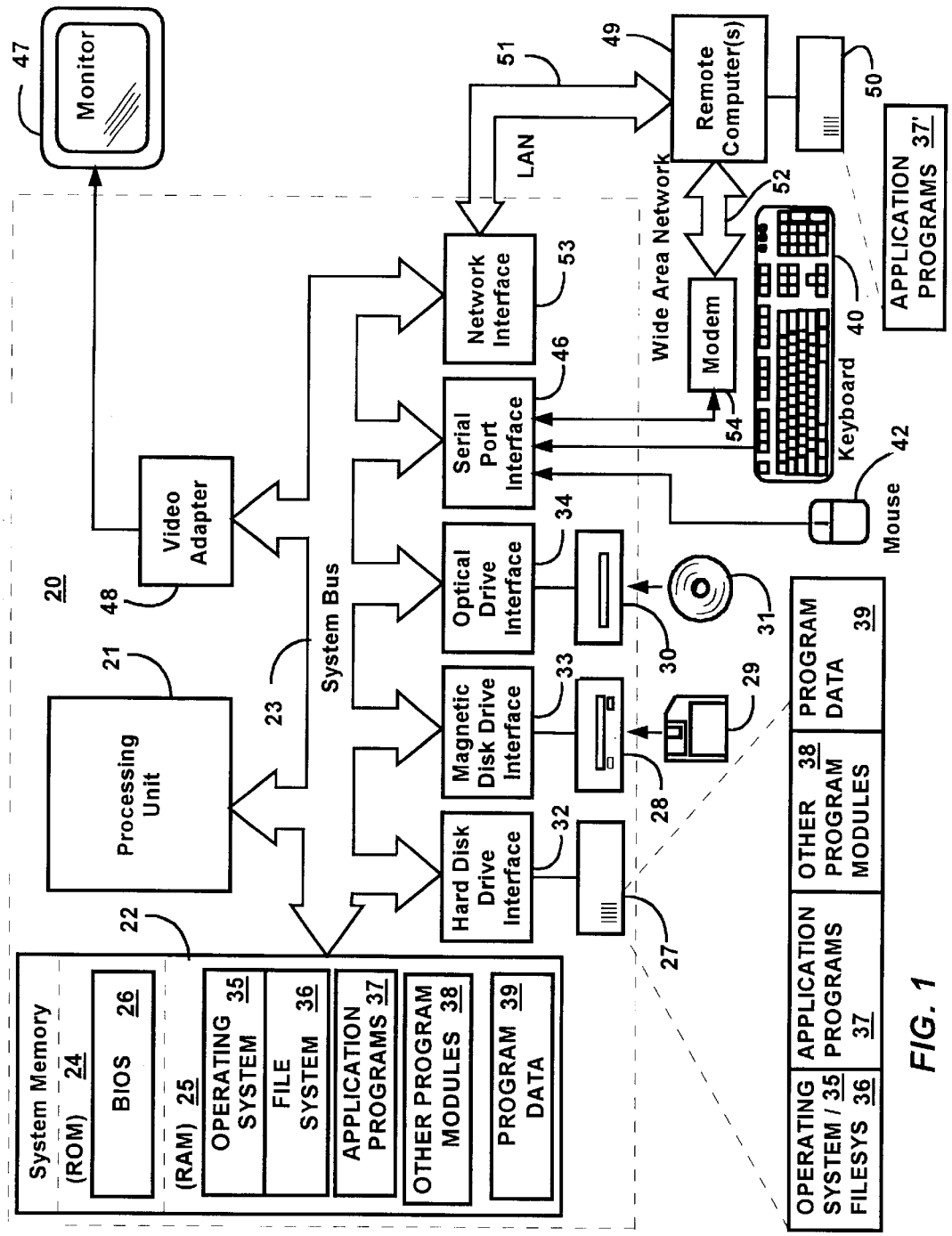
FIG. 1 is a block diagram representing a computer system into which the present invention may be incorporated.

FIG. 1 and the following discussion are intended to provide a brief general description of a suitable computing environment in which the invention may be implemented. Although not required, the invention will be described in the general context of computer-executable instructions, such as program modules, being executed by a personal computer. Generally, program modules include routines, programs, objects, components, data structures and the like that perform particular tasks or implement particular abstract data types. Moreover, those skilled in the art will appreciate that the invention may be practiced with other computer system configurations, including hand-held devices, multi-processor systems, microprocessor-based or programmable consumer electronics, network PCs, minicomputers, mainframe computers and the like. The invention may also be practiced in distributed computing environments where tasks are performed by remote processing devices that are linked through a communications network. In a distributed computing environment, program modules may be located in both local and remote memory storage devices.

With reference to FIG. 1, an exemplary system for implementing the invention includes a general purpose computing device in the form of a conventional personal computer 20 or the like, including a processing unit 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures. The system memory includes read-only memory (ROM) 24 and random access memory (RAM) 25. A basic input/output system 26 (BIOS), containing the basic routines that help to transfer information between elements within the personal computer 20, such as during start-up, is stored in ROM 24. The personal computer 20 may further include a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD-ROM, DVD-ROM or other optical media. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide non-volatile storage of computer readable instructions, data structures, program modules and other data for the personal computer 20. Although the exemplary environment described herein employs a hard disk, a removable magnetic disk 29 and a removable optical disk 31, it should be appreciated by those skilled in the art that other types of computer readable media that can store data that is accessible by a computer, such as magnetic cassettes, flash memory cards, digital video disks, Bernoulli cartridges, random access memories (RAMs), read-only memories (ROMS) and the like may also be used in the exemplary operating environment.

A number of program modules may be stored on the hard disk, magnetic disk 29, optical disk 31, ROM 24 or RAM 25, including an operating system 35 (such as Windows® 2000). The computer 20 includes a file system 36 associated with or included within the operating system 35, such as the Windows NTCR) File System (NTFS), one or more application programs 37, other program modules 38 and program data 39. A user may enter commands and information into the personal computer 20 through input devices such as a keyboard 40 and pointing device 42. Other input devices (not shown) may include a microphone, joystick, game pad, satellite dish, scanner or the like. These and other input devices are often connected to the processing unit 21 through a serial port interface 46 that is coupled to the system bus, but may be connected by other interfaces, such as a parallel port, game port or universal serial bus (USB). A monitor 47 or other type of display device is also connected to the system bus 23 via an interface, such as a video adapter 48. In addition to the monitor 47, personal computers typically include other peripheral output devices (not shown), such as speakers and printers.

The personal computer 20 may operate in a networked environment using logical connections to one or more remote computers 49. The remote computer (or computers) 49 may be another personal computer, a server, a router, a network PC, a peer device or other common network node, and typically includes many or all of the elements described above relative to the personal computer 20, although only a memory storage device 50 has been illustrated in FIG. 1. The logical connections depicted in FIG. 1 include a local area network (LAN) 51 and a wide area network (WAN) 52. Such networking environments are commonplace in offices, enterprise-wide computer networks, Intranets and the Internet.

When used in a LAN networking environment, the personal computer 20 is connected to the local network 51 through a network interface or adapter 53. When used in a WAN networking environment, the personal computer 20 typically includes a modem 54 or other means for establishing communications over the wide area network 52, such as the Internet. The modem 54, which may be internal or external, is connected to the system bus 23 via the serial port interface 46. In a networked environment, program modules depicted relative to the personal computer 20, or portions thereof, may be stored in the remote memory storage device. It will be appreciated that the network connections shown are exemplary and other means of establishing a communications link between the computers may be used.

The present invention is generally described herein with reference to Microsoft Corporation's Windows 2000 (formerly Windows NT®) operating system, and in particular to the Windows NT® file system (NTFS). Notwithstanding, there is no intention to limit the present invention to Windows® 2000, Windows NT® or NTFS. Rather, the present invention is intended to operate with and provide benefits with any operating system, architecture, or file system.

Illustrative Snapshot System

Figure 2:
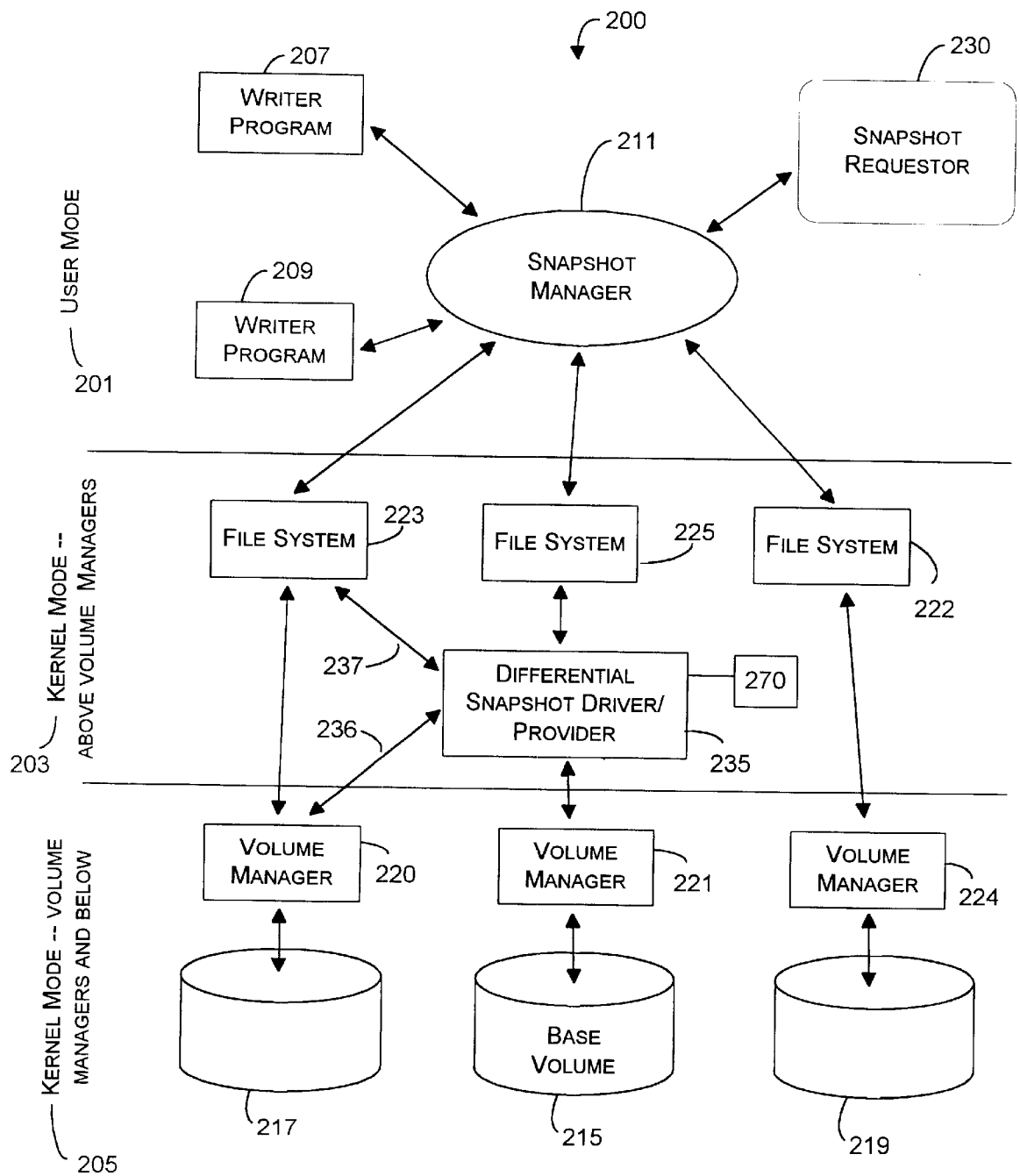
FIG. 2 is a block diagram representing a snapshot system capable of being used in conjunction with the computer system of FIG. 1 and in which the present invention may be embodied.
Figure 3:
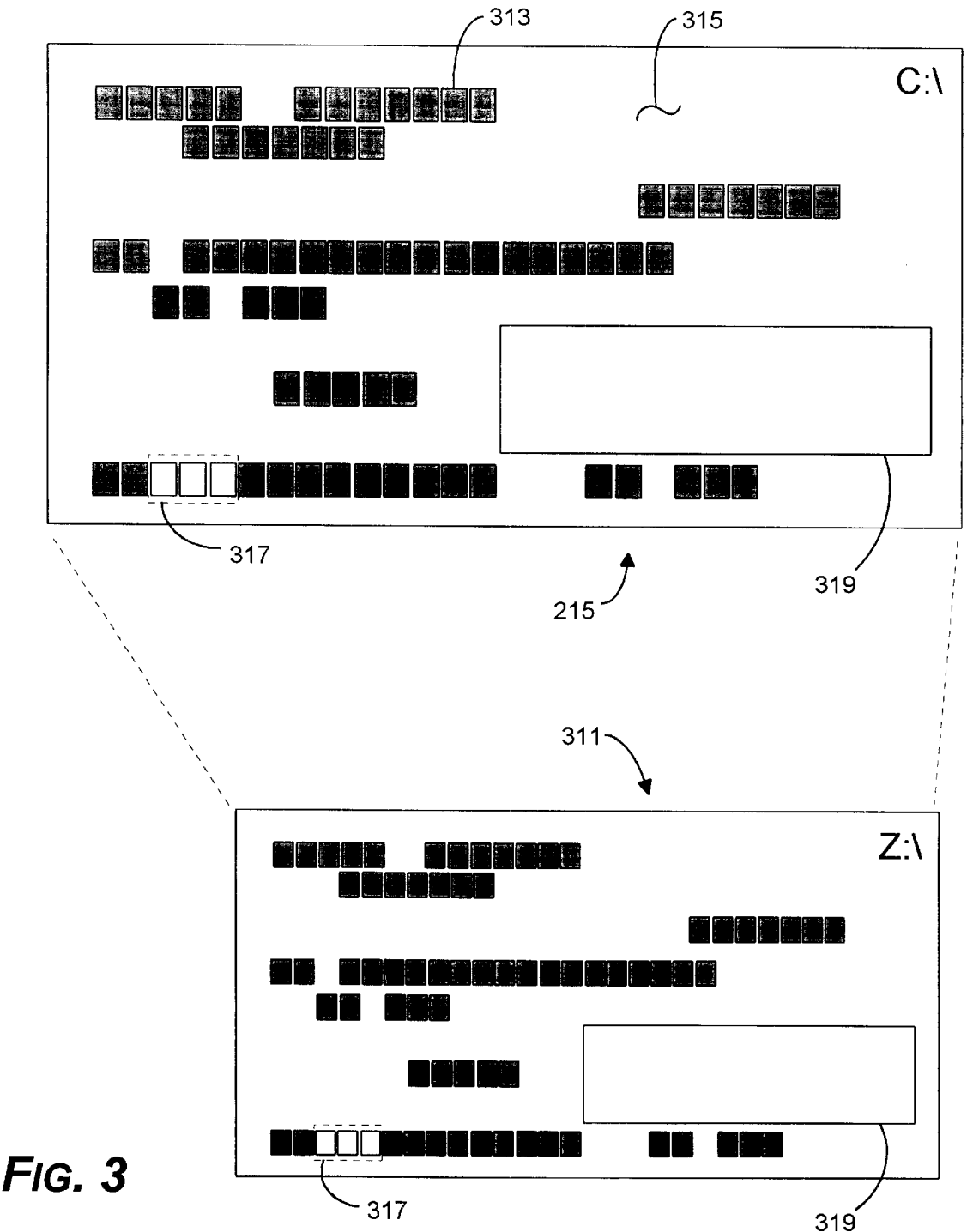
FIG. 3 is a representation of the storage space on a base volume and a snapshot volume at the instant a snapshot is captured.
Figure 4:
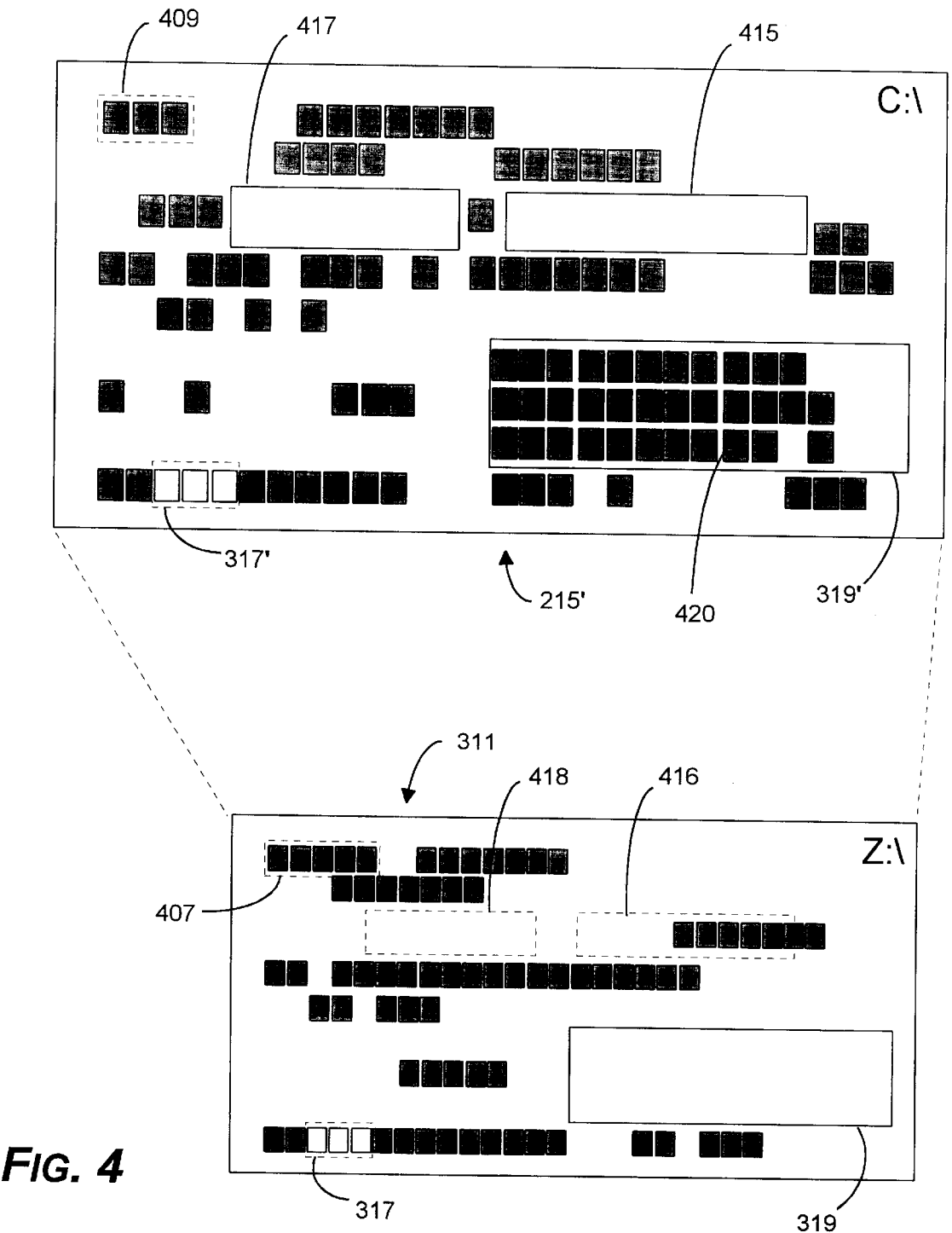
FIG. 4 is a representation of the storage space on the base volume and the snapshot volume illustrated in FIG. 3 at some time after the a snapshot was captured.

FIGS. 2–4 and the following discussion provide a brief, general description of one embodiment of a snapshot system 200 operating within the personal computer 20 and through which the invention may be implemented. Referring first to FIG. 2, various components of the snapshot system 200 may reside in either a user mode 201 or a kernel mode of the operating system 35. In this example, the kernel mode is further divided into an upper kernel mode 203 (above volume managers) and a lower kernel mode 205 (volume managers and below). The user and kernel modes are illustrated for completeness only, and are not necessary to the present invention. As is known in the art, there is an ordering of subsystems in an I/O path of an I/O message or request, and that ordering is essential for the correct functioning of an I/O subsystem. For example, in the Windows® 2000 operating system, the I/O subsystem organizes drivers as a stack.

Resident in the lower kernel mode 205 are three storage volumes: a base volume 215, a second volume 217, and a third volume 219. As is known in the art, a volume is a fixed amount of storage on a disk, such as hard disk 27, tape or other storage medium. The term "volume" is often used as a synonym for the storage medium itself, but it is possible for a single disk to contain more than one volume or for a volume to span more than one disk. A volume manager, such as volume manager 221, controls low-level I/O operations on behalf of its associated volume. The volume managers each interact with a corresponding file system to carry out the I/O operations on the volume. For instance, the volume manager may communicate with a hardware device driver (not shown) to perform reads and writes to the physical locations on the disk constituting the volume, and the file system may maintain the allocation status of the volume and handle I/O messages on behalf of the volume. In the disclosed example, file system 222 interacts with volume manager 224 to perform I/O operations on volume 219.

Executing in the user mode 201 are writer programs, such as writer program 207 and writer program 209, which may be any programs capable of initiating a change to data stored on the volumes. Common examples of writer programs are Microsoft® Word, Microsoft® Exchange, and the like. The writer programs read from or write to the volumes (and thereby modify data) by issuing I/O messages (e.g., via API calls to an I/O manager) to the file systems associated with each volume. Also executing in the user mode 201 is a snapshot requester 230, which is a process that may issue a request for a snapshot to be taken of one or more volumes. One example of a snapshot requester may be a component of a backup program, or the operating system itself may request a snapshot.

A snapshot manager 211 is also included in the snapshot system 200 and resides in the user mode 201 of the illustrative snapshot system 200. The snapshot manager 211 is a program that coordinates a snapshot operation by interfacing with the writer programs, the snapshot requester 230, and other components of the snapshot system 200, such as the file systems. The snapshot manager 211 is responsible for coordinating and issuing messages to various components of the snapshot system 200 to cause the snapshot to be captured.

Also in the kernel mode, a differential snapshot driver/ provider (the snapshot driver) 235 is included in the snapshot system 200. The snapshot driver 235 may be a process that performs the actual operations necessary to capture and maintain a snapshot. For example, the snapshot driver 235 may perform the actual copy-on-write functions to maintain the snapshot. The operations necessary to capture the snapshot may, alternatively, be performed by hardware components (not shown) within the computer 20. The snapshot driver 235 may maintain a snapshot bitmap 270 or other listing that identifies those allocation units on the base volume 215 that contained data at the instant the snapshot was captured and that have not yet been copied to a differential file.

The snapshot driver 235 may be a filter driver in a driver stack as illustrated by the driver stack of file system 225, snapshot driver 235, and volume manager 221. Although the snapshot driver 235 is illustrated below the file system 225 in the filter stack, those skilled in the art will appreciate that the snapshot driver 235 may reside at other locations in the filter stack, such as above the file system 225, through the use of appropriate messages and interfaces between the snapshot driver 235 and the other drivers in the filter stack. Alternatively, the snapshot driver 235 may be a process executing in the kernel mode that is accessible by other drivers as illustrated by interfaces 236 and 237. The operation and interaction of the components of the snapshot system 200 are described in detail below with regard to FIGS. 5 and 6.

FIGS. 3 and 4 are representations of the storage space on the base volume 215 at the instant a snapshot 311 is captured (FIG. 3) and at some time later (FIG. 4). Referring first to FIG. 3, the base volume 215 is the actual volume residing on a physical storage disk or tape, such as hard disk 27, or other non-volatile storage medium. The several shaded blocks on the base volume 215 each represent an allocation unit that contains data, such as allocation unit 313. In this example, each allocation unit represents a cluster on the storage disk supporting the base volume 215. Those allocation units on the base volume 215 that do not contain data, or are unallocated, are illustrated as free space 315.

The file system 225 associated with the base volume 215 maintains a free space file 317 on the base volume 215. As is known in the art, the free space file 317 reflects the allocation state of each allocation unit on the volume. In one implementation, the free space file 317 contains a bitmap, each of whose bits represents an allocation unit on the base volume 215 with a setting that identifies whether the allocation unit is free or has been allocated to data. Thus, the free space file 317 identifies, either directly or indirectly, the free space on the base volume 215. Those skilled in the art will appreciate that mechanisms other than a bitmap or file may be employed to track the allocated and unallocated space on the base volume 215, and the invention envisions the use of any acceptable one of those mechanisms for tracking free space.

In accordance with one aspect of the present invention and as represented in FIG. 3, a group of free allocation units on the base volume 215 is allocated for a differential file 319 prior to the instant the snapshot was captured. The operations performed to allocate the free space to the differential file 319 are generally described below with respect to the process illustrated in FIG. 5 and FIG. 6.

A snapshot volume 311, illustrated in FIG. 3 and FIG. 4 as "Z:\", is a logical representation of the base volume 215 the way it existed at the instant the snapshot was captured. The snapshot volume 311 is not a physical volume, but rather a logical combination of data stored on the base volume 215 modified by difference data stored in the differential file 319. As is represented in FIG. 3 by the same clusters being allocated on both the base volume (C:\) and the snapshot volume (Z:\), the snapshot volume 311 represents a copy of the base volume 215 at the instant the snapshot was captured.

FIG. 4 illustrates the base volume 215' at some time after the snapshot was captured. Over time, writer programs, such as writer program 207, may modify information stored on the base volume 215. The modifications may include writing new data to previously-unallocated space, overwriting original data with new data, or deleting original data from the base volume 215. For instance, an old file 407 may have been deleted from the base volume 215 (as represented by the snapshot volume 311) and a new file 409 written to certain of the allocation units formerly occupied by the old file 407. Thus, any particular allocation unit on the base volume 215' may contain the same or different data when compared to the snapshot volume 311, which reflects the state of the base volume 215 at the earlier time.

The illustrated embodiment employs the copy-on-write method for storing information about changes to the base volume 215. As data on the base volume 215 is modified, the original data (the data that was present at the time the snapshot was captured) is copied to the differential file 319 prior to new data being written. It will be appreciated that if original data is deleted, the original data may be immediately copied to the differential file 319, or the copy to the differential file 319 may be deferred until the data is actually overwritten. If a writer program reads from the snapshot volume 311, the information stored in the differential file 319 is applied by the snapshot driver 235 to the later base volume 215' to recreate the state of the base volume 215 at the earlier time.

As illustrated in FIG. 4, original data 420 stored in the differential file 319 may, over time, begin to fill up the space allocated to the differential file 319. In accordance with one aspect of the invention, and as will be discussed below with respect to FIG. 5, the differential file 319 may be expanded as needed into new free space, such as potential free space 417.

Operation of the Snapshot System

Figure 5:
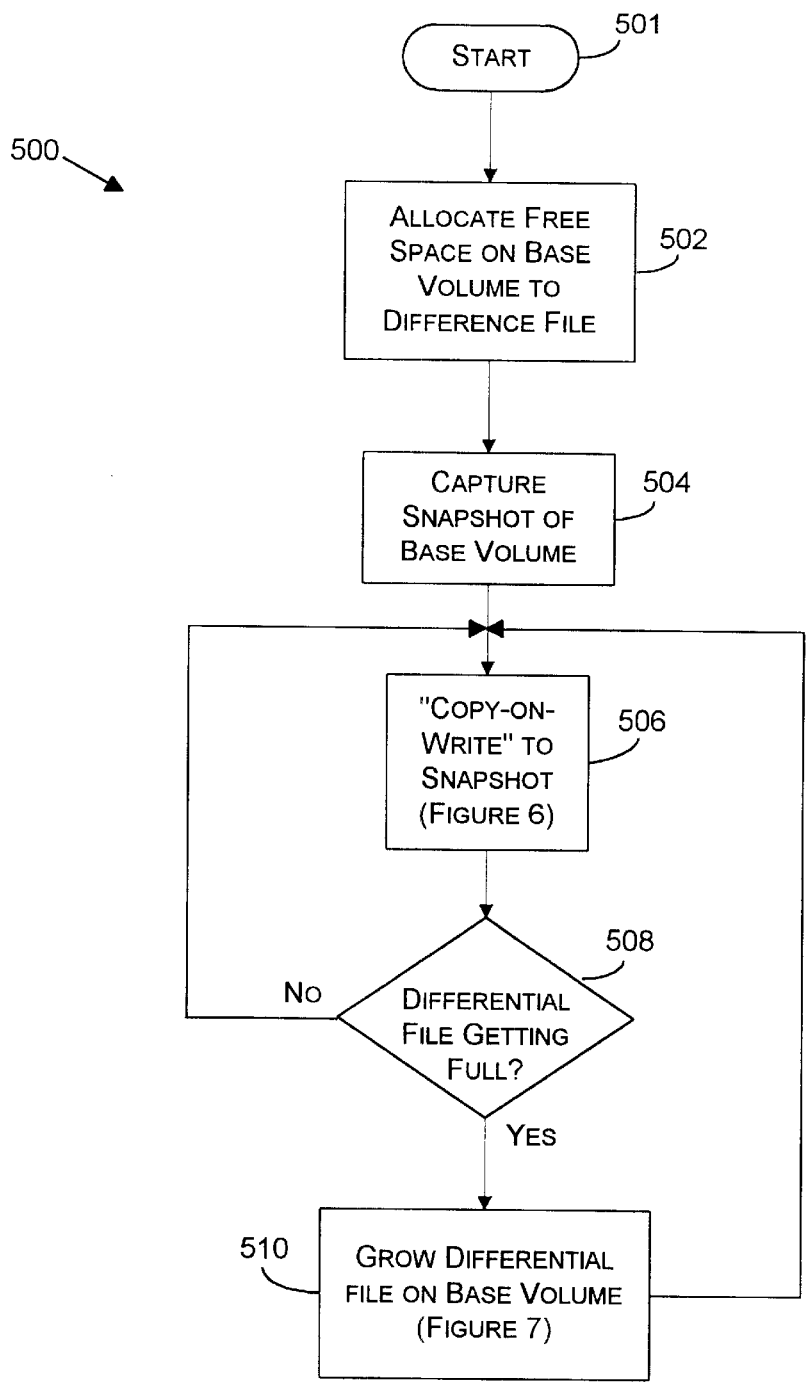
FIG. 5 is a logical flow diagram illustrating a process performed to create and maintain a differential file on the base volume in accordance with an aspect of the present invention.
Figure 6:
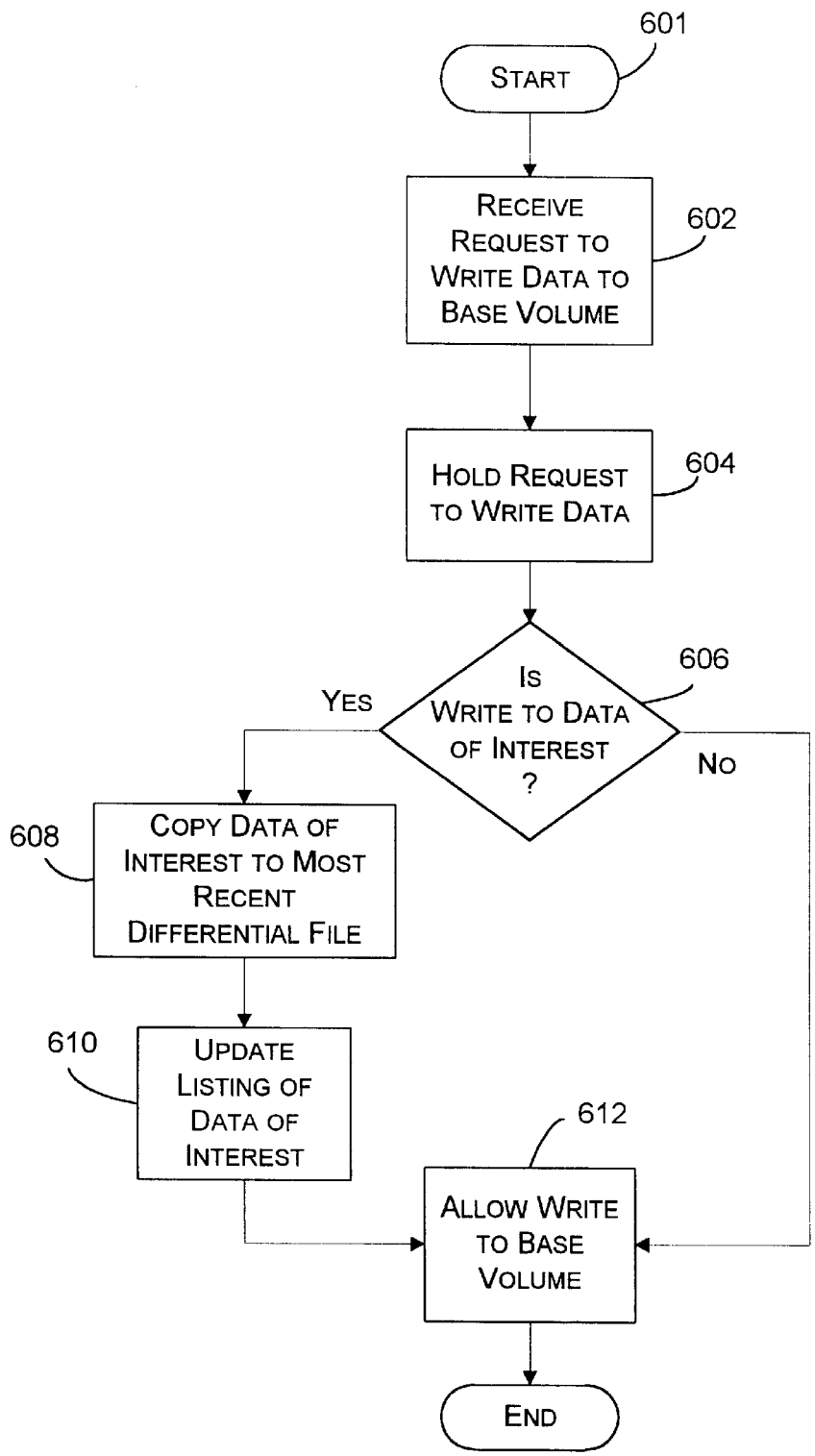
FIG. 6 is a logical flow diagram illustrating a process performed to copy-on-write original data to a differential file associated with a snapshot of the base volume.

FIGS. 5 and 6 are logical flow diagrams illustrating a process 500 performed by a snapshot system, such as the illustrative snapshot system 200, implementing the invention. Referring first to FIG. 5, the process 500 enters at starting block 501, where a snapshot operation has been requested by the snapshot requester 230. For example, the snapshot requester 230 may issue a message to the snapshot manager 211 requesting that a snapshot be taken of the base volume 215. The snapshot manager 211 may then begin the snapshot operation by issuing appropriate messages to other components of the snapshot system 200, such as a message to the snapshot driver 235 notifying it of the snapshot operation, and a similar message to the file system 225. The snapshot manager 211 may also, optionally, issue messages to the writer programs requesting that they suspend unnecessary writes to the base volume 215. After the snapshot operation has begun, the process continues at block 502.

At block 502, prior to the instant that the actual snapshot volume 311 is captured, the snapshot driver 235 issues a message to the file system 225 to allocate free space on the base volume 215 to the differential file 319, and to prevent writes to that allocated free space by any writer program. However, writes may continue to allocation units outside of the free space allocated to the differential file 319. Because of the pre-allocation, the snapshot operation may capture the snapshot without suspending all writes to the base volume 215, thereby reducing the overall performance degradation of the snapshot operation. Once free space is allocated to the differential file 319, the process proceeds to block 504.

At block 504, the snapshot system 200 performs the operations to capture the snapshot of the base volume 215. For instance, the snapshot system 200 may flush a write cache buffer associated with the volume manager 221 to the disk, and construct the kernel data structures (e.g., bitmaps and indexes) that characterize and define a snapshot volume for the computing system 20. It should be appreciated that a snapshot may be taken across multiple volumes, such as the base volume 215, the second volume 217, and the third volume 219. In that case, a snapshot coordinator mechanism (not shown) may be employed to synchronize the capturing of the snapshot across the multiple volumes. One such mechanism is described in co-pending patent application Ser. No. 09/505,344; entitled "Kernel-Based Crash-Consistency Coordinator," filed on Feb. 16, 2000, and assigned to the same assignee as this Patent Application.

As mentioned above, writes to the space allocated to the differential file 319 by any writer programs are disallowed. Thus, the writer programs cannot modify the free space allocated to the differential file 319, but may continue modifying data on the base volume 215 outside of the differential file 319. Because the snapshot instant has not yet been reached, changes to the base volume 215 while the snapshot is pending are allowed. However, immediately after the snapshot instant, any writes by writer programs to the base volume 215 that modify original data automatically result in the original data being copied to the differential file 319 prior to the modification. The process continues at block 506.

At block 506, the snapshot driver 235 performs any copy-on-write operations, as appropriate, to ensure that the snapshot volume 311 continues to reflect the state of the base volume 215 at the snapshot instant. The operations performed by the process 506 are illustrated in detail in FIG. 6 and described below. Briefly described, when new data is written to allocation units on the base volume 215 that currently contain original data, the original data is copied to the differential file 319 prior to writing the new data.

At decision block 508, a test is performed to determine whether the difference file 319'0 is getting full. The test may be a simple comparison of the number of allocation units remaining free in the space allocated to the differential file 319'. Other mechanisms are equally feasible for use as a triggering event when the differential file becomes full, such as a mechanism based on percentages (e.g., grow when greater than eighty percent). In any event, the process returns to block 506 and the snapshot driver 225 continues to copy-on-write as needed until the free space in the differential file 319' falls below a given threshold, at which point the process continues to block 510.

At block 510, the snapshot system 200 grows the differential file 319' on the base volume 215'. The operations performed to identify acceptable allocation units in which to grow the differential file 319 are illustrated in detail in FIG. 7 and described below. Briefly described, the differential file 319' grows into allocation units that are currently unallocated (on base volume 215') and also that were unallocated when the snapshot was captured (on base volume 215). Toward that end, the snapshot system 200 identifies appropriate allocation units and causes the file system 225 to allocate additional space for the differential file 319. When additional space is dedicated to the differential file 319, the process 500 returns to block 506, which performs again as described above. Note that if the differential file is stored on a volume other than the base volume 215, such a differential file may be grown using the current free space of that other volume without reference to free space on the base volume.

Alternatively, the differential file may be grown without regard to whether the additional space was free at the time the snapshot was captured. To that end, subsequent writes to the differential file by the snapshot driver 235 are themselves subject to the copy-on-write procedure. Note that instead of copying the data to another location within the differential file, the snapshot driver 235 may be configured (e.g. by checking the snapshot bitmap) to avoid writing to those locations during subsequent copy-on-write operations, whereby a read of the snapshot volume still results in the original data being available. The process 500 continues in this fashion for the useful life of the snapshot.

FIG. 6 is a logical flow diagram illustrating a process performed to copy-on-write original data to a differential file associated with a snapshot of the base volume. The process enters at starting block 601, where a snapshot volume has been captured and the snapshot driver 225 prepares to perform the copy-on-write operations described above to maintain the snapshot. It should be noted that the process 600 illustrated in FIG. 6 is the same process performed when any snapshot is created. After the snapshot is created, the process proceeds to block 602.

At block 602, the process awaits a notice from the file system 235 that a write is being attempted to an allocation unit on the base volume 215. When the snapshot driver 235 receives a request from the file system 225 to write data to the base volume 215, the process proceeds to block 604, where the snapshot driver 235 holds the write request. The process then continues at decision block 606.

At decision block 606, the snapshot driver 235 determines whether the write request is directed to allocation units on the base volume 215 that currently contain data of interest, i.e. original data that existed at the instant the snapshot was captured. For example, the snapshot driver 235 may maintain a listing, such as the snapshot bitmap 270, of allocation units for which old data should be copied prior to being overwritten. In that case, the snapshot driver 235 may compare the intended allocation unit of the write request with the snapshot bitmap 270 to determine if the original data should be copied. If the write request is not directed to data of interest, the process proceeds to block 612, where the snapshot driver 235 allows the write operation to proceed. If the write request is directed to data of interest, the process proceeds to block 608.

At block 608, the data of interest is copied to the most reclcent differential file 319. It should be noted that, in accordance with this embodiment of the invention, the old data need not be copied to all differential files if multiple snapshots exist, but rather only to the most recent one. The snapshot driver 235 may issue a message to the file system 235 to actually perform the copy of the data. The process continues at block 610.

At block 610, the snapshot driver 235 updates its listing of allocation units for which old data should be copied prior to being overwritten by clearing the entry associated with the data copied at block 608. In this manner, future writes to the allocation unit copied at block 608 will not be copied the same differential file. The process then proceeds to block 612, where the snapshot driver 235 allows the write operation to proceed by releasing the write request or passing the write request to a lower-level driver, such as the volume manager 221.

Figure 7:
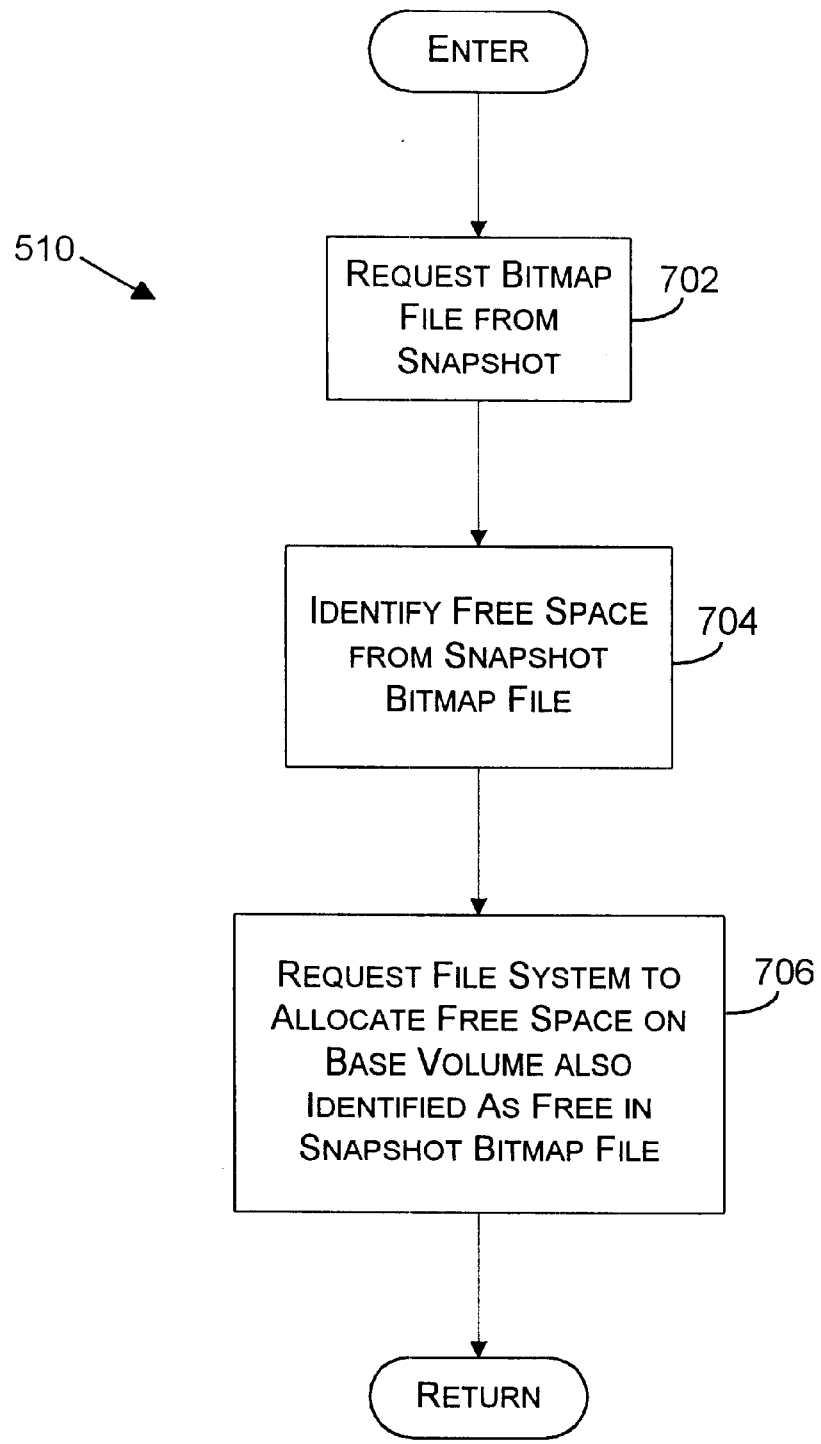
FIG. 7 is a logical flow diagram illustrating a process performed to grow the differential file on the base volume in accordance with an aspect of the present invention.

FIG. 7 is a logical flow chart illustrating in greater detail the operations performed at block 510 of FIG. 5 to identify acceptable allocation units in which to grow the differential file 319. The process of FIG. 7 enters at block 702, where the snapshot driver 235 requests the free space file 317 from the snapshot volume 311. That file represents the free space at the time the snapshot was taken, not the current free space of the base volume 215. Although the illustrative embodiment makes use of a free space file 317, those skilled in the art will appreciate that other types of files or mechanisms may be used to maintain the allocated state of each allocation unit on the base volume 215.

By using the free space file 317 of the snapshot volume 311, the snapshot system 200 overcomes the need to separately track writes to the base volume 215 during each copyon-write operation which is less efficient, more complex, and may, for example, result in a noticeably negative performance impact. However, the invention may still be realized through any mechanism capable of identifying allocated or unallocated space on the base volume 215 at the time the snapshot is captured.

At block 704, the snapshot driver 225 identifies the space marked as free in the free space file 317. As mentioned, the free space file 317 stored on the snapshot volume 311 identifies the unallocated space on the base volume 215 at the instant the snapshot was captured. It should be noted that, in one implementation, the free space file 317 on the snapshot volume 311 is actually recreated by applying changes stored in the differential file 319' to the later free space file 317' stored on the base volume 215'. The process continues at block 706. At block 706, the snapshot driver 225 issues a request to the file system 225 to allocate free space on the base volume 215' that is also identified as free in the free space file 317 of the snapshot volume 311. Accordingly, the file system 225 may compare free space information from the free space file 317 with free space in the current free space file 317' to identify acceptable locations in which to grow the differential file 319'. For example, the snapshot driver 225 may pass the free space file 317 from the snapshot volume to the file system 225 which combines it with the current free space file 317' to determine space that is free in both.

Alternatively, the file system 225 may use the current free space file 317' to identify one or more potential locations in which to grow the differential file, e.g., potential free space 415 and potential free space 417 (as illustrated in FIG. 4). However, the snapshot driver 235, by comparing the allocations of those potential locations (416 and 418 respectively) on the snapshot volume 311 to the free space file 317 of the snapshot volume 311, recognizes that a portion of the potential free space 415 collides with space that was allocated when the snapshot was captured. Accordingly, that portion of the potential free space 415 is ruled out as candidate space in which to grow the differential file 319', although other portions may still be used. Alternatively, the snapshot driver 235 can "clean out" the potential free space allocation portions still having original data by copying those portions to the differential file 319'.

In contrast, no portion of potential free space 417 on the snapshot volume 311 collides with space that was allocated at the instant the snapshot was captured, as represented in FIG. 4 by the empty area. Those portions which do not collide may be safely used to grow the differential file 319'.

Those skilled in the art will appreciate that the file system 225 and the snapshot driver 235 may cooperate to ensure the proper allocation of potential free space 417 to grow the differential file 319. For example, if less than all the space requested by the snapshot driver 235 is useable, the snapshot driver 235 may pass one or more instructions to the file system 225 requesting that additional free space be allocated to the differential file 319 until the amount that is useable meets some threshold value. Another way is to have an instruction that specifically identifies the allocation units which are to be excluded from consideration by the file system 225 when allocating new free space. These and other alternatives will become apparent to those skilled in the art.

After the additional free space on base volume 215' is allocated to the differential file 319' processing returns to block 506 of FIG. 5 and continues as described above. In this manner, the usable life of the snapshot volume 311 is extended such that future writes to allocation units occupied by data at the time of the snapshot may be copied to the newly allocated space of the differential file, such as new free space 418.

Lastly, one alternative that may enhance the overall performance of the snapshot system is to collect the free space bitmap after the snapshot instant. In order to collect the free space bitmap after the snapshot instant, the snapshot system performs the copy-on-write operation for writes until the free space bitmap is collected to avoid losing data, which may result in unnecessary copy-on-writes. However, this alternative avoids an interruption of disk accesses to the base volume while the snapshot is being captured. After the free space from the bitmap is removed from the "interesting data" bitmap, the snapshot system need only perform copy-on-writes for the interesting data and unnecessary copy-on-writes are thereafter avoided.

As can be seen from the foregoing detailed description, the invention provides a system and method for creating a snapshot with a differential file pre-allocated and maintained on the base volume, and that can grow as needed. While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

What is claimed is:

1. A computer-readable medium having computer-executable instructions, comprising:
   creating a snapshot volume, including:
      allocating free space on a base volume to a differential file at a first time;
      fixing a snapshot instant representing the state of the base volume when the snapshot volume was created, the snapshot instant being at a second time that is after the first time; and
      allowing writes to space on the base volume other than to the free space allocated to the differential file between the first time and the second time.

2. The computer-readable medium of claim 1, wherein allowing writes to space on the base volume comprises preventing writes to the differential file.

3. The computer-readable medium of claim 1, wherein creating the snapshot volume further comprises writing information to the differential file after the snapshot instant.

4. The computer-readable medium of claim 3, wherein writing information comprises:
   suspending a write operation to a portion of the base volume outside of the differential file and occupied by original data;
   copying the original data to the differential file; and
   releasing the write operation to the portion of the base volume.

5. The computer-readable medium of claim 1, further comprising:
   writing information to the differential file after the snapshot instant and representing the state of the base volume at the snapshot instant.

6. The computer-readable medium of claim 5, further comprising:
   allocating additional free space on the base volume to the differential file in response to a triggering event.

7. The computer-readable medium of claim 6, wherein the triggering event comprises a notification that the information written to the differential file exceeds a given threshold with respect to the free space allocated to the differential file.

8. The computer-readable medium of claim 6, wherein the additional free space on the base volume was also free space when the snapshot volume was captured.

9. A computer-readable medium having computer-executable instructions, comprising:
   allocating free space on a base volume for a differential file associated with a snapshot of the base volume;
   identifying additional space in which to grow the differential file based on free space associated with the base volume at the time the snapshot was captured; and
   growing the differential file into the additional space.

10. The computer-readable medium of claim 9, wherein identifying additional space includes accessing a first set of data identifying the free space associated with the base volume at the time the snapshot was captured.

11. The computer-readable medium of claim 10, wherein identifying the additional space further comprises:
   accessing a second set of data identifying free space associated with the base volume; and wherein
   allocating free space from the first set of data further comprises allocating free space common to both the first set of data and the second set of data.

12. The computer-readable medium of claim 10, wherein the first set of data includes a free space bitmap associated with the snapshot of the base volume.

13. The computer-readable medium of claim 11, wherein the second set of data includes a free space bitmap associated with the base volume.

14. The computer-readable medium of claim 13, wherein the first set of data includes a free space bitmap associated with the snapshot of the base volume.

15. The computer-readable medium of claim 9, wherein allocating the free space on the base volume for the differential file occurs prior to the snapshot being captured.

16. The computer-readable medium of claim 15, further comprising preventing write operations to the free space allocated to the differential file during the period that the snapshot is being captured.

17. The computer-readable medium of claim 16, further comprising allowing write operations to space on the base volume other than the allocated free space.

18. In a computer-system, a method of maintaining a snapshot volume of a base volume, comprising:
   creating a snapshot volume representing the state of the base volume when the snapshot volume was created, including:
      allocating free space on a base volume to a differential file;
      allowing writes to the base volume other than to the free space allocated to the differential file;
   identifying additional space in which to grow the differential file by;
      accessing a first set of data identifying free space associated with the base volume at the time the snapshot was captured; and
   allocating free space from the first set of data as the additional space in which to grow the differential file.

19. The method of claim 18, wherein allocating the free space on the base volume occurs prior to creating the snapshot volume.

20. The method of claim 18, wherein the first set of data includes a free space bitmap file.

21. The method of claim 20, wherein the free space bitmap file is associated with the snapshot volume.

22. A computer-readable medium having computer-executable components, comprising:
   a snapshot manager configured to initiate a snapshot operation by issuing a snapshot message;
   a snapshot driver in operative communication with the snapshot manager and being configured to, in response to the snapshot message, allocate free space on a base volume to a differential file and then to cause a snapshot volume of the base volume to be captured while allowing write operations to the base volume outside of the free space allocated to the differential file; and
   a file system in operative communication with the snapshot driver and being configured to write data to the base volume.

23. The computer-readable medium of claim 22, wherein:
   the snapshot driver is further configured to write original information stored on the base volume to the differential file in response to an attempt by the file system to write new information over the original information.

24. The computer-readable medium of claim 22, wherein the snapshot driver is further configured to identify space on the base volume that was free at the instant that the snapshot volume was captured and to grow the differential file into the space that was free at the instant that the snapshot volume was captured.

25. The computer-readable medium of claim 24, wherein the snapshot driver identifies the space that was free at the instant that the snapshot volume was captured by accessing a set of data identifying the free space on the base volume at the time the snapshot was captured.

26. The computer-readable medium of claim 25, wherein the set of data identifying the free space includes a free space bitmap file associated with the snapshot volume.

27. A computer-readable medium having computer-executable instructions, comprising:

allocating free space on a volume for a differential file associated with a snapshot of a base volume;

identifying additional space in which to grow the differential file based on free space associated with the volume; and growing the differential file into the additional space.

28. The computer-readable medium of claim 27, wherein the volume of the differential file comprises the base volume, and wherein identifying the additional space includes identifying the additional space based on free space associated with the base volume at the time the snapshot was captured.

* * * * *